(12) United States Patent
Hakenholt et al.

(10) Patent No.: US 10,458,458 B2
(45) Date of Patent: Oct. 29, 2019

(54) FASTENING ARRANGEMENT WITH AN AXIALLY AFFIXED COMPOUND-SQUEEZING DISK

(71) Applicant: Hilti Aktiengesellschaft, Schaan (LI)

(72) Inventors: Christoph Hakenholt, Feldkirch (AT); Anke Wildermuth, Grabs (CH)

(73) Assignee: Hilti Aktienbesellschaft, Schaan (LI)

( * ) Notice: Subject to any disclaimer, the term of this patent is extended or adjusted under 35 U.S.C. 154(b) by 438 days.

(21) Appl. No.: 15/129,761

(22) PCT Filed: Mar. 31, 2015

(86) PCT No.: PCT/EP2015/056964
§ 371 (c)(1),
(2) Date: Sep. 27, 2016

(87) PCT Pub. No.: WO2015/150357
PCT Pub. Date: Oct. 8, 2015

(65) Prior Publication Data
US 2017/0138390 A1    May 18, 2017

(30) Foreign Application Priority Data
Apr. 1, 2014  (EP) .................................... 14163063

(51) Int. Cl.
*F16B 39/02*  (2006.01)
*F16B 39/22*  (2006.01)
(Continued)

(52) U.S. Cl.
CPC .......... *F16B 39/225* (2013.01); *F16B 13/141* (2013.01); *F16B 25/0026* (2013.01)

(58) Field of Classification Search
CPC ..... F16B 39/225; F16B 13/141; F16B 13/146
(Continued)

(56) References Cited

U.S. PATENT DOCUMENTS

| | | | | |
|---|---|---|---|---|
| 1,145,462 A | * | 7/1915 | Barton | ............... E04B 1/4121 411/439 |
| 1,311,646 A | * | 7/1919 | Gordon | ............... E04B 1/4121 52/705 |

(Continued)

FOREIGN PATENT DOCUMENTS

| | | |
|---|---|---|
| DE | 2224023 | 11/1972 |
| DE | 3304071 | 8/1984 |

(Continued)

OTHER PUBLICATIONS

International Search Report of PCT/EP2015/056964 dated Jun. 10, 2015, 3 pages.

*Primary Examiner* — Gary W Estremsky
(74) *Attorney, Agent, or Firm* — Davidson, Davidson & Kappel, LLC

(57) ABSTRACT

A fastening arrangement with a screw having a shank with a front end that is to be inserted into a hole drilled into a substrate, and at least one thread, whereby the thread is arranged on the shank, and with a squeezing unit having a compound reservoir containing a compound for filling a gap that exists between the shank and the wall of the drilled hole, with a squeezing disk towards which the front end of the shank can be moved in order to squeeze the compound out of the reservoir, and having a holding element for fastening the squeezing disk in the drilled hole, whereby, arranged on the holding element, on the one hand, there is the squeezing disk and, on the other hand, a stop element that comes to rest against the opening of the drilled hole.

16 Claims, 1 Drawing Sheet

(51) Int. Cl.
*F16B 13/14* (2006.01)
*F16B 25/00* (2006.01)

(58) Field of Classification Search
USPC .................................................. 411/82, 82.3
See application file for complete search history.

(56) References Cited

U.S. PATENT DOCUMENTS

| | | | |
|---|---|---|---|
| 3,240,379 A | 3/1966 | Bremer | |
| 4,514,125 A | 4/1985 | Stol et al. | |
| 5,366,328 A * | 11/1994 | Helderman | B25B 27/143 29/456 |
| 5,562,377 A * | 10/1996 | Giannuzzi | F16B 13/141 405/259.5 |
| 6,837,018 B1 * | 1/2005 | Hagel | F16B 13/146 405/259.1 |
| 7,708,500 B2 * | 5/2010 | Buquet | F16B 13/061 405/259.5 |
| 8,171,697 B2 * | 5/2012 | Zimmer | F16B 13/144 411/32 |
| 8,186,918 B2 * | 5/2012 | Bucquet | F16B 13/143 411/38 |
| 8,287,218 B2 * | 10/2012 | Zimmer | F16B 13/144 411/82 |
| 8,404,065 B2 * | 3/2013 | Miller | F16B 13/141 156/71 |
| 8,585,335 B2 * | 11/2013 | Carbonelli | F16B 13/144 206/219 |
| 2005/0058521 A1 * | 3/2005 | Stevenson | F16B 13/002 411/82 |
| 2005/0058522 A1 * | 3/2005 | Hughes | F16B 13/146 411/82 |

FOREIGN PATENT DOCUMENTS

| | | |
|---|---|---|
| DE | 19813089 | 9/1990 |
| DE | 19820671 A1 | 11/1999 |
| DE | 102011003127 A1 | 7/2012 |
| EP | 0221020 | 5/1987 |
| GB | 442832 | 2/1936 |
| GB | 1382054 | 1/1975 |

* cited by examiner

Fig. 1
Fig. 2
Fig. 3
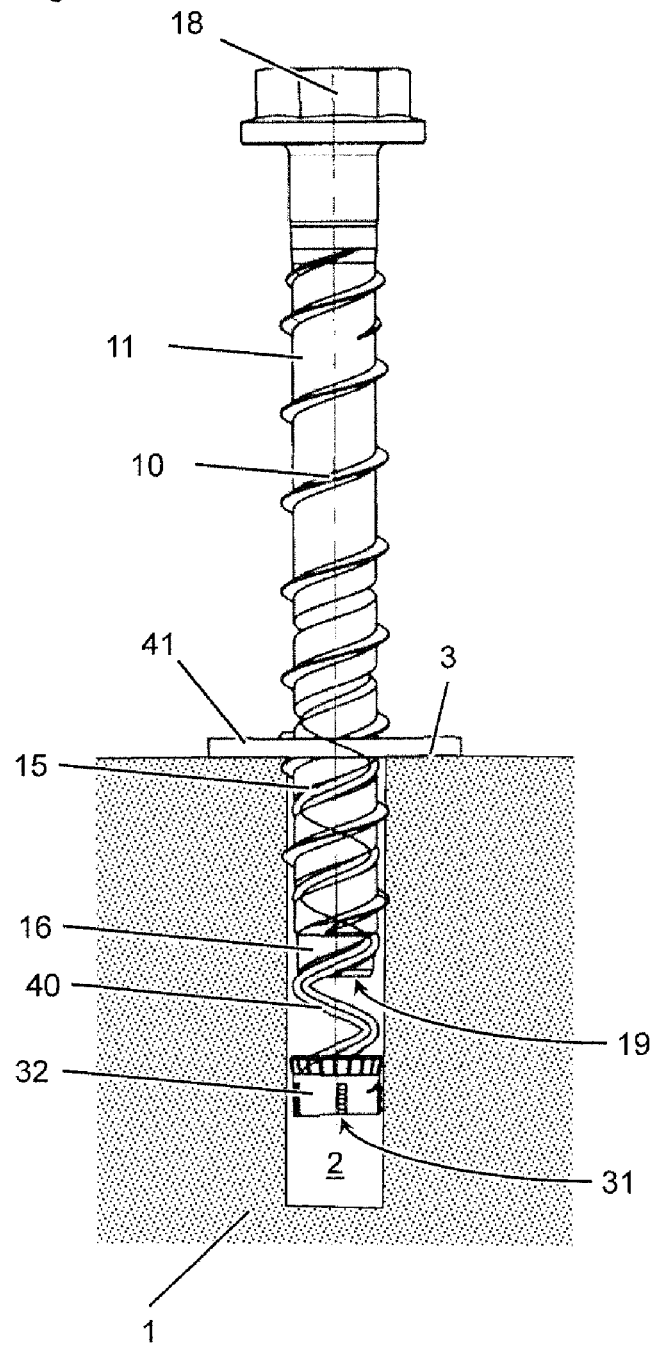
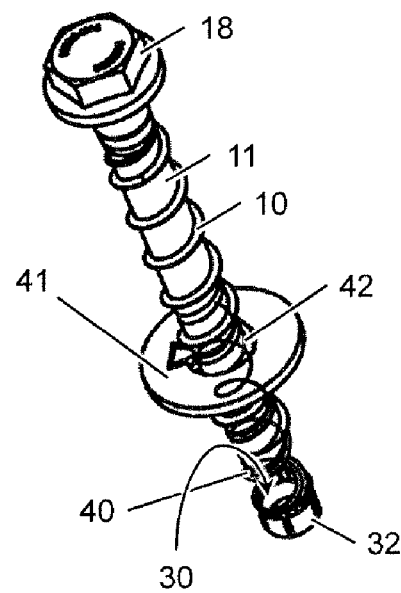
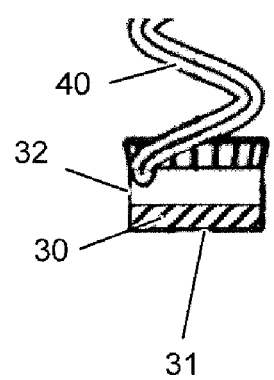

FASTENING ARRANGEMENT WITH AN AXIALLY AFFIXED COMPOUND-SQUEEZING DISK

The invention relates to a fastening arrangement with a screw, especially a tapping screw.

BACKGROUND

German patent application DE 198 20 671 A1 discloses a method for anchoring a tapping screw in a hole drilled into concrete, whereby first the hole is drilled and then a mortar compound is inserted into the drilled hole. Subsequently, the tapping screw is screwed into the drilled hole, a process in which the tip of the tapping screw penetrates the mortar compound and displaces some of the mortar compound back along the shank, in other words, towards the opening of the drilled hole. The final outcome is for the entire drilled hole to be filled with the mortar compound so that the tapping screw is surrounded by the hardened mortar compound.

German patent application DE 10 2011 003127 A1 describes another method for anchoring a tapping screw. This patent application proposes inserting a cartridge into the drilled hole so that it is crushed by the screw when the latter is screwed in. This then releases the curable compound. The use of a stop drill bit is meant to ensure that the drilled hole is of a defined depth. In this manner, according to DE 10 2011 003127 A1, it is possible to dispense with a conceivably costly compound metering procedure during the placement of the screw.

SUMMARY OF THE INVENTION

It is an object of the present invention to provide a screw that can be screwed in particularly easily and reliably while also achieving excellent load values and outstanding reliability.

A fastening arrangement according to the invention comprises
- a screw having a shank with a front end that is to be inserted into a hole drilled into a substrate, and at least one thread, whereby the thread is arranged on the shank, and
- a squeezing unit having a compound reservoir containing a compound for filling a gap that exists between the shank and the wall of the drilled hole, a squeezing disk towards which the front end of the shank can be moved in order to squeeze the compound out of the reservoir, and a holding element for securing the squeezing disk in the drilled hole, whereby, arranged on the holding element, on the one hand, there is the squeezing disk and, on the other hand, a stop element that comes to rest against the opening of the drilled hole.

A first fundamental idea of the invention resides in providing the screw with a squeezing unit having a compound reservoir as well as a squeezing disk, whereby the compound reservoir is squeezed out when the screw is screwed into a drilled hole situated between the squeezing disk and the front end of the screw, as a result of which the compound contained in the reservoir ends up in the gap, especially an annular gap, that exists between the shank and the wall of the drilled hole. Another fundamental idea of the invention relates to equipping the squeezing unit with a holding element that axially secures the squeezing disk in the drilled hole when the screw is being screwed in. Since the squeezing disk is axially secured in the drilled hole by the holding element whereas, the shank, in contrast, axially penetrates the drilled hole deeper and deeper as the screw is being tightened, the shank and the squeezing disk approach each other as the screw is being tightened. As a result, the volume between the squeezing disk and the shank is reduced so that compound reservoir situated between the squeezing disk and the shaft is squeezed out by the squeezing disk.

This means that the invention makes it possible to create a filled and/or glued screwed connection, so that very high load values of the screw in the substrate can be obtained, particularly in case of static, dynamic and/or seismic load situations. In this context, according to the invention, a defined quantity of compound is provided to the user, and this translates into a high level of reliability. At the same time, the process for the placement of the screw according to the invention becomes very easy for the user. After all, since the compound according to the invention can be applied automatically and directly while the screw is being put in place, there is no need for an additional work step in order to insert the compound into the drilled hole by means of a separate pump. Moreover, according to the invention, it is also possible to work with drilled holes of variable depths, without this making it necessary to every time measure out the amount of curable compound as a function of the depth of the drilled hole, which would be a laborious task. In particular, according to the invention, the start of the procedure of squeezing the compound out of the reservoir can be specified very easily and reliably on the basis of the position of the holding element, thus translating into very uniform placement results and further increasing the reliability of the screwed-in fastening arrangement.

For purposes of axially securing the squeezing disk in the drilled hole, one side of the holding element is attached to the squeezing disk whereas, on the other side, there is a stop element that comes to rest against the opening of the drilled hole when the squeezing unit is placed into the drilled hole. Therefore, the holding element ensures a mechanical connection, preferably one that can resist tensile forces, between the substrate and the squeezing disk. In order to achieve a very compact structure, it can be advantageous for the squeezing disk to be arranged at the end of the holding element. For the same reason, as an alternative or in addition, it can be advantageous for the stop element to be arranged at the end of the holding element. In particular, the squeezing disk and the stop element can be arranged on opposite end sections of the holding element.

The term "opening of the drilled hole" can especially refer to an area on the surface of the substrate that surrounds the drilled hole. When it comes to the axial, radial and circumferential directions, these terms can refer especially to the longitudinal axis of the drilled hole, of the shank and/or of the screw.

It is especially advantageous for the screw to be a tapping screw, in other words, a screw whose at least one thread can dig its own mating thread in the substrate. In particular, the screw can be a concrete screw, that is to say, a screw with which the at least one thread can cut its own mating thread in a concrete substrate. Fundamentally, however, the invention could also be employed with screws that are being screwed into an existing inner thread.

The compound reservoir advantageously contains a free-flowing compound that, under the pressure that is exerted between the squeezing disk and the front end of the shank, can flow out of the compound reservoir into the annular gap that exists between the shank and the wall of the drilled hole. In particular, this can be a curable compound that preferably hardens after it has flowed into the gap between the shank and the wall of the drilled hole. Therefore, the compound can especially be a free-flowing, curable filling compound. This compound can be, for instance, a multi-component synthetic-resin mortar on the basis of polyester resin or epoxy resin that is activated when the components are mixed together. In this case, the components in the compound reservoir can be present separated from each other and can become mixed when they are squeezed out. Preferably, the compound is a curable adhesive. The adhesive is preferably activated by pressure, for example, by the pressure exerted by the squeezing disk. In this manner, the adhesive can be activated by the action of the squeezing disk and can subsequently harden between the shank and the wall of the drilled hole. However, the adhesive can also be activated only once pressure is exerted between the shank and the wall of the drilled hole. The adhesive can also be a microencapsulated adhesive that is activated when the microencapsulation is broken.

On the shank, there can be one or more threads that project radially from it. The thread begins especially at the front end of the shank. At the rear end of the shank, opposite from the front end of the shank, there is preferably a load-attack element that serves to introduce tensile forces into the shank, for example, the head of a screw that extends radially beyond the cross section of the shank. The shank can be configured so as have an at least approximately cylindrical shape and/or can be made of metal. The squeezing disk can be made, for instance, of plastic, which can be advantageous in terms of the production effort involved.

The holding element especially has to absorb tensile forces between the squeezing disk and the opening of the drilled hole and therefore can be configured especially as a holding element that can resist tensile forces. For instance, it can be a strip that connects the squeezing disk and the stop element. The holding element can be a plastic material and/or a metal material.

It is especially preferred if at least certain sections of the holding element are configured to be helical. Among other things, the number of crossovers of the holding element with the thread can be reduced very easily and reliably, thus improving the reliability even further. In particular, it can be achieved that there are no crossovers whatsoever. The holding element, which is helical at least in certain sections, and the thread advantageously have the same direction of rotation. Advantageously, the pitch of the holding element, which is helical at least in certain sections, at least approximately matches the pitch of the thread so that the holding element can always run between the threads. Particularly in the case of large pitches, however, it is not always necessary to have such an exact match. The holding element, which is helical at least in certain sections, preferably forms a mating thread to the thread. This prevents the holding element from rotating along while the screw is being put in place. The holding element, which is helical at least in certain sections, is especially intended to accommodate at least certain sections of the shank.

The term "pitch" as employed in the technical realm can especially refer to the distance between two thread stages along the longitudinal axis of the shank and/or it refers to the axial distance that is traversed during one rotation of the thread.

In a preferred refinement of the invention, the shank has a groove to accommodate at least certain sections of the holding element. This counters any undesired friction against the holding element, thereby further improving the reliability. Insofar as at least certain sections of the holding element are configured so as to be helical, the groove can preferably be helical.

For example, the stop element can be formed by simply bending over the end of the holding element that is configured, for example, as a wire or a strip. Particularly in this case, the stop element can be formed in one piece with the holding element. Another preferred embodiment consists of the stop element being a circular washer having a through-hole through which the shank passes. Consequently, with little production effort, it is possible to easily further improve the handling properties and also the reliability because, among other things, there is a relatively large contact area. The circular washer can be a closed ring or else an open ring, whereby the ring opening can serve, for instance, for the insertion of the shank.

The compound reservoir can be arranged for example, on the screw. However, it is particularly preferable for the compound reservoir to be arranged on the squeezing disk, especially prior to the beginning of the squeezing procedure. This makes it possible, among other things, to reduce the production work involved and to improve the handling characteristics as well as the reliability. The squeezing disk can be configured so as to be flat or curved, for instance, with a central indentation. The squeezing disk can also have perforations.

It is likewise preferable for the squeezing disk to have a sealing collar. In particular, the sealing collar can be provided in order to accommodate the front end of the shank, preferably in a flush manner. According to this embodiment, the squeezing disk can form a half-shell, in other words, a container, in which the compound reservoir is arranged and into which the tip of the shank fits precisely. This translates into a very well-defined flow of the compound.

The invention also relates to a method for the placement of the screw according to the invention, in which the squeezing disk and the compound reservoir of the squeezing unit are placed into the drilled hole, and especially subsequently, the screw is screwed into the drilled hole, whereby the holding element axially secures the squeezing disk in the drilled hole and the squeezing disk squeezes compound out of the compound reservoir.

Especially preferably, the at least one thread cuts a mating thread into the substrate, in other words, the screw functions as a tapping screw. When the screw is being screwed in, the squeezing disk is in front of the front end of the shank, and the compound reservoir is arranged between the squeezing disk and the front end of the shank. The compound is squeezed out of the compound reservoir especially in that the volume that exists between the squeezing disk and the front end of the shank is reduced.

Preferably, it can be provided that the squeezing disk and the compound reservoir of the squeezing unit are first inserted into the drilled hole to such a depth that the stop element comes to rest against the opening of the drilled hole, and the screw is subsequently screwed into the drilled hole. According to this embodiment, at the beginning of the placement procedure, the squeezing unit is first completely inserted into the drilled hole and only then does the placement procedure of the screw begin, in other words, the rotation of the screw around its longitudinal axis. This translates into a particularly well-defined squeezing procedure.

In particular, the screw and the squeezing unit can be inserted into the drilled hole separately. As an alternative, it can be provided that the squeezing unit is arranged on the screw, and subsequently, the squeezing disk and the compound reservoir of the squeezing unit are inserted into the drilled hole, whereby the squeezing unit and the screw are joined together when the squeezing disk and the compound reservoir are being inserted into the drilled hole. According to this embodiment, the squeezing unit is pre-installed on the screw, and the screw as well as the squeezing unit are placed as a single piece into the drilled hole. This can further reduce the work for the user. In particular, the screw and the squeezing unit can be delivered as a single piece to the user.

BRIEF DESCRIPTION OF THE DRAWINGS

The invention will be elaborated upon below on the basis of preferred embodiments that are schematically depicted in the accompanying figures, whereby individual features of the embodiments shown below can fundamentally be implemented individually or else in any desired combination within the scope of the invention. The figures schematically show the following:

FIG. 1: a side view of a fastening arrangement according to the invention, in a hole drilled into a substrate, during the placement of the screw;

FIG. 2: the fastening arrangement from FIG. 1, in a perspective view, whereby, for the sake of clarity, the substrate is not shown; and FIG. 3: a lengthwise sectional view of the front part of the squeezing unit, especially comprising the compound reservoir and the squeezing disk of the fastening arrangement from FIG. 1.

DETAILED DESCRIPTION

FIGS. 1 to 3 show an embodiment of a fastening arrangement according to the invention. The fastening arrangement has a screw with an approximately cylindrical shank 11 on whose rear end there is a load-attack element that is shown by way of an example as a screw head 18 and that serves to introduce tensile forces into the shank 11. A helical tapping thread 10 is arranged on the circumferential surface of the shank 11 of the screw.

The fastening arrangement also has a squeezing unit. This squeezing unit has a squeezing disk 31 which is in the form of a circular disk and whose diameter is preferably about the same as the diameter of the shank 11 of the screw, said disk being axially in front of the front end 19 of the shank 11 of the screw when the fastening arrangement has been assembled. As can especially be seen in FIG. 3, a compound reservoir 30 containing a free-flowing, squeezable compound is arranged on the squeezing disk 31.

In the embodiment shown, the squeezing disk 31 has a sleeve-like, especially cylindrical, sealing collar 32 that extends from the squeezing disk 31 towards the front end 19 of the shank 11 of the screw. Together with the sealing collar 32, the squeezing disk 31 forms a half-shell that accommodates the compound reservoir 30.

The squeezing unit also has a stop element 41 that is configured as a circular washer having a through-hole 42 through which the shaft 11 of the screw passes. Moreover, the squeezing unit has a helical holding element 40 configured, for instance, in the form of a wire, that connects the stop element 41 to the squeezing disk 31. For purposes of the connection to the squeezing disk 31, the stop element 41 can be arranged, for example, on the sealing collar 32.

The helical holding element 40 and the shank 11 of the screw are dimensioned in such a way that the helical holding element 40 can accommodate the front end 19 of the shank 11. In particular, there is a helical groove 15 on the front end 19 of the shank 11 for purposes of accommodating the helical holding element 40. The through-hole 42 of the stop element 41 and the helical holding element 40 are arranged coaxially, so that the shank 11 can be inserted all the way through the through-hole 42 into the helical holding element 40. The squeezing disk 31 is arranged in the axial extension of the interior of the helical holding element 40.

In a first alternative of the method for the placement of the screw of the shown fastening arrangement into a hole 2 drilled into a substrate 1, at first the squeezing unit is separated from the screw. In this alternative method, the squeezing unit is placed into the drilled hole 2 separately from the screw and, in this process, the compound reservoir 30—together with the squeezing disk 31—is inserted into the drilled hole 2 to such a depth that the stop element 41 comes to rest against the opening 3 of the drilled hole 2. Then, the shank 11 of the screw is inserted all the way through the through-hole 42 in the annular stop element 41 into the drilled hole 2 and the thread 10 is screwed into the substrate by applying a torque on the screw head 18. In this process, the screw is screwed into the helical holding element 40 and into the drilled hole 2. As a result, the front end 19 of the shank 11 axially approaches the compound reservoir 30 and the squeezing disk 31, both of which are axially affixed by the stop element 41 and the holding element 30, until the front end 19 of the shank 11 comes to rest against the compound reservoir 30. Further tightening of the screw axially compresses the compound reservoir 30 between the axially advancing front end 19 of the shank 11 and the axially fixed squeezing disk 31, so that the free-flowing compound contained in the compound reservoir 30 is squeezed out and enters the annular gap that exists between the wall of the drilled hole and the shank 11, where it hardens and can then stabilize the screw. In particular, the squeezing procedure can involve the destruction of the compound reservoir 30.

In a second alternative of the method, the squeezing unit can also be joined to the screw ahead of time, and the squeezing unit, as a single piece with the screw, can be inserted into the drilled hole 2. For the rest, the procedure is the same as described in conjunction with the first alternative of the method.

As can especially be seen in FIG. 1, adjoining the front end 19 of the shank 11, there is a threadless tip area 16 with a smaller diameter. During the placement procedure, this tip area 16 of the shank 11 reaches the sealing collar 32 of the squeezing disk 31.

What is claimed is:

1. A fastening arrangement comprising:
    a screw having a shank with a front end to be inserted into a hole drilled into a substrate, and having at least one thread arranged on the shank; and
    a squeezing unit having a compound reservoir containing a compound for filling a gap existing between the shank and the wall of the drilled hole, a squeezing disk, the front end of the shank movable toward the squeezing disk in order to squeeze the compound out of the reservoir, and a holding element for fastening the squeezing disk in the drilled hole, the squeezing disk being arranged on one side of the holding element and a stop element adapted to come to rest against the opening of the drilled hole being arranged on another side of the holding element wherein at least certain sections of the holding element are configured with a helical shape.

2. The fastening arrangement as recited in claim 1 wherein the shank has a groove to accommodate at least certain sections of the holding element.

3. The fastening arrangement as recited in claim 1 wherein the stop element is a circular washer having a through-hole, the shank passing through the through-hole.

4. The fastening arrangement as recited in claim 1 wherein the compound reservoir is arranged on the squeezing disk.

5. The fastening arrangement as recited in claim 1 wherein the squeezing disk has a sealing collar to accommodate the front end of the shank.

6. A method for the placement of the screw of the fastening arrangement as recited in claim 1, the method comprising:
   placing the squeezing disk and the compound reservoir of the squeezing unit of the fastening arrangement as recited in claim 1 into the drilled hole; and
   screwing the screw of the fastening arrangement as recited in claim 1 into the drilled hole, the holding element axially securing the squeezing disk in the drilled hole and the squeezing disk squeezing compound out of the compound reservoir.

7. The method as recited in claim 6 wherein the squeezing disk and the compound reservoir of the squeezing unit are first inserted into the drilled hole to such a depth that the stop element comes to rest against the opening of the drilled hole, and in that the screw is subsequently screwed into the drilled hole.

8. The method as recited in claim 6 wherein the squeezing unit is arranged on the screw, and in that subsequently, the squeezing disk and the compound reservoir of the squeezing unit are inserted into the drilled hole, the squeezing unit and the screw being joined together when the squeezing disk and the compound reservoir are being inserted into the drilled hole.

9. The method as recited in claim 6 wherein the screwing step is subsequent to the placing step.

10. A fastening arrangement comprising:
    a screw having a shank with a front end to be inserted into a hole drilled into a substrate, and having at least one thread arranged on the shank; and
    a squeezing unit having a compound reservoir containing a compound for filling a gap existing between the shank and the wall of the drilled hole, a squeezing disk, the front end of the shank movable toward the squeezing disk in order to squeeze the compound out of the reservoir, and a holding element for fastening the squeezing disk in the drilled hole, the squeezing disk being arranged on one side of the holding element and a stop element adapted to to rest against the opening of the drilled hole being arranged on another side of the holding element; wherein the shank has a groove to accommodate at least certain sections of the holding element.

11. The fastening arrangement as recited in claim 10 wherein the stop element is a circular washer having a through-hole, the shank passing through the through-hole.

12. The fastening arrangement as recited in claim 10 wherein the compound reservoir is arranged on the squeezing disk.

13. The fastening arrangement as recited in claim 10 wherein the squeezing disk has a sealing collar to accommodate the front end of the shank.

14. A fastening arrangement comprising:
    a screw having a shank with a front end to be inserted into a hole drilled into a substrate, and having at least one thread arranged on the shank; and
    a squeezing unit having a compound reservoir containing a compound for filling a gap existing between the shank and the wall of the drilled hole, a squeezing disk, the front end of the shank movable toward the squeezing disk in order to squeeze the compound out of the reservoir, and a holding element for fastening the squeezing disk in the drilled hole, the squeezing disk being arranged on one side of the holding element and a stop element adapted to rest against the opening of the drilled hole being arranged on another side of the holding element; wherein the squeezing disk has a sealing collar to accommodate the front end of the shank.

15. The fastening arrangement as recited in claim 14 wherein the stop element is a circular washer having a through-hole, the shank passing through the through-hole.

16. The fastening arrangement as recited in claim 14 wherein the compound reservoir is arranged on the squeezing disk.

* * * * *